(12) United States Patent
Biswas et al.

(10) Patent No.: US 12,658,954 B2
(45) Date of Patent: Jun. 16, 2026

(54) METHOD AND APPARATUS FOR INCREASING RFID READ RANGE IN DAISY CHAIN CONFIGURATION

(71) Applicant: Hand Held Products, Inc., Charlotte, NC (US)

(72) Inventors: Gourango Lal Biswas, Charlotte, NC (US); Pankaj Kumar Pandey, Charlotte, NC (US); Shashidhar Ramamurthy, Charlotte, NC (US); Gulshan Kumar, Charlotte, NC (US)

(73) Assignee: Hand Held Products, Inc., Charlotte, NC (US)

( * ) Notice: Subject to any disclaimer, the term of this patent is extended or adjusted under 35 U.S.C. 154(b) by 339 days.

(21) Appl. No.: 18/415,254

(22) Filed: Jan. 17, 2024

(65) Prior Publication Data

US 2024/0297673 A1 Sep. 5, 2024

(30) Foreign Application Priority Data

Mar. 2, 2023 (IN) .............................. 202311014121

(51) Int. Cl.
| | |
|---|---|
| *H04B 5/00* | (2024.01) |
| *H04B 1/10* | (2006.01) |
| *H04B 5/45* | (2024.01) |

(52) U.S. Cl.
CPC ............. *H04B 1/1027* (2013.01); *H04B 5/45* (2024.01)

(58) Field of Classification Search
CPC .......... H04B 1/1027; H04B 5/45; H04B 1/24; H04B 1/525; H04B 7/04; G06K 7/10178; G06K 7/10356; H04W 4/80
See application file for complete search history.

(56) References Cited

U.S. PATENT DOCUMENTS

| | | | |
|---|---|---|---|
| 5,974,301 | A | 10/1999 | Palmer et al. |
| 2015/0227767 | A1* | 8/2015 | Sock .................... H01Q 1/2216 340/10.1 |

(Continued)

FOREIGN PATENT DOCUMENTS

| | | |
|---|---|---|
| CN | 106877899 A | 6/2017 |
| CN | 109583252 A | 4/2019 |

(Continued)

OTHER PUBLICATIONS

Extended European Search Report Mailed on Oct. 14, 2024 for EP Application No. 24153795, 13 page(s).

(Continued)

*Primary Examiner* — Ping Y Hsieh
(74) *Attorney, Agent, or Firm* — Alston & Bird LLP

(57) ABSTRACT

A repeating switch antenna comprising a transmission signal amplifier configured to amplify a transmission signal based on a power control signal, a first coupler configured to receive (i) the amplified transmission signal, (ii) a reception signal, and (iii) a load impedance, a noise cancelation circuit configured to generate the load impedance based on an in-phase channel input and a quadrature channel input, a digital acquisition system configured to (i) generate the power control signal, (ii) generate the in-phase channel input and the quadrature channel input, and (iii) generate a select signal, reception signal amplifier configured to receive the reception signal from the first coupler and amplify the reception signal, and a radio frequency (RF) switch configured to (i) route the amplified transmission signal from the first coupler to the RF connector or to an antenna based on the select signal, and (ii) route the reception signal to the first coupler.

20 Claims, 6 Drawing Sheets

(56)                    References Cited

U.S. PATENT DOCUMENTS

2019/0114452 A1*   4/2019   Rötzer .............. G06K 7/10237
2021/0195323 A1    6/2021   Oshikata
2022/0036021 A1*   2/2022   Burchell ................ G04F 10/00

FOREIGN PATENT DOCUMENTS

EP          0831594  A2    3/1998
EP          2564348       *   1/2016   .............. G06K 7/00
EP          2564348  B1  *  1/2016   ........... G06K 7/0008
EP          3483774  A1  *  5/2019   ........... G06K 7/0008
EP          4274107  A1  *  11/2023   .............. H04B 5/45
KR   10-2016-0055023  A    5/2016

OTHER PUBLICATIONS

Partial European search report Mailed on Jul. 22, 2024 for EP
Application No. 24153795, 15 page(s).
Zhe Fu, "A Novel Long-Range Passive UHF RFID System over
Twisted-pair Cable," Dissertation, University of Cambridge, 166
pages, (Nov. 2018). [Retrieved from the Internet Jul. 23, 2024:
URL: <https://core.ac.uk/download/pdf/200999991.pdf>].

* cited by examiner

METHOD AND APPARATUS FOR INCREASING RFID READ RANGE IN DAISY CHAIN CONFIGURATION

CROSS-REFERENCE TO RELATED APPLICATIONS

This application claims priority pursuant to 35 U.S.C. 119 (a) to Indian Application No. 202311014121, filed Mar. 2, 2023, which application is incorporated herein by reference in its entirety.

TECHNICAL FIELD

Various embodiments of the present disclosure relate to a radio frequency identification (RFID) reader, and more particularly to a system that extends a communication range of a RFID reader.

BACKGROUND

RFID technology may be used in a variety of applications, such as asset tracking, inventory management, toll collection, cargo and supply chain logistics, vehicle tracking, loss prevention, and access control operations, to name a few. An RFID system may comprise a RFID reader and transponders comprising RFID transponders that may be placed on objects to be tracked. An RFID reader may comprise a radio frequency transceiver that when triggered, sends a radio frequency (RF) transmission signal towards one or more RFID transponders within a given range. The one or more RFID transponders may receive the RF transmission signal and transmit a RF response signal which is received and read by the RFID reader.

However, placement of RFID transponders may be located too far at a distance from the RFID reader that may make them difficult to track. For example, RFID read range of passive RFID transponders is limited by forward path loss. Primarily, limited read range may be attributed to low power being induced in passive RFID transponders and hence unable to excite or activate the RFID transponders. Active RFID transponders may be used to further increase range but by a marginal amount for a greater cost.

There is a need to extend coverage of a RFID reader in a cost-effective manner without sacrificing performance.

BRIEF SUMMARY

Various embodiments described herein relate to methods, apparatuses, and systems for amplifying RF signals transmitted between devices connected in a daisy chain comprising a RFID reader, one or more switch antennas, and one or more repeating switch antennas.

According to one embodiment, a repeating switch antenna comprises a transmission signal amplifier configured to amplify a transmission signal based on a power control signal, a first coupler configured to receive (i) the amplified transmission signal, (ii) a reception signal, and (iii) a load impedance, a noise cancellation circuit configured to generate the load impedance based on an in-phase channel input and a quadrature channel input, a digital acquisition system (DAS) configured to (i) generate the power control signal, (ii) generate the in-phase channel input and the quadrature channel input, and (iii) generate a select signal, reception signal amplifier configured to receive the reception signal from the first coupler and amplify the reception signal, a first radio frequency (RF) connector configured to receive the transmission signal and the amplified reception signal via a second coupler, a second RF connector configured to transmit the amplified transmission signal, and a RF switch configured to (i) route the amplified transmission signal from the first coupler to the second RF connector or to an antenna based on the select signal, and (ii) route the reception signal to the first coupler.

In some embodiments, the transmission signal originates from a RFID reader. In some embodiments, the transmission signal is received from the RFID reader via a daisy chain comprising one or more switch antennas and one or more other ones of repeating switch antennas. In some embodiments, the DAS comprises one of: a programmable system on chip, a field programmable gate array, an application-specific integrated circuit, a programmable logic, or a microprocessor. In some embodiments, the repeating switch antenna further comprises a power detector configured to detect a power level of the transmission signal, and transmit an analog signal representative of the power level of the transmission signal to the DAS. In some embodiments, the DAS is further configured to generate the power control signal based on the analog signal representative of the power level of the transmission signal. In some embodiments, the repeating switch antenna further comprises a RFID integrated circuit. In some embodiments, the DAS is configured to generate the select signal based on unique identifiers associated with spatially difference locations provided by the RFID integrated circuit. In some embodiments, the load impedance causes a cancelation effect on transmission leakage from the transmission signal. In some embodiments, each of the in-phase channel and the quadrature channel are associated with respective resistor-capacitor circuits within the noise cancelation circuit. In some embodiments, the DAS is further configured to generate the in-phase channel input and the quadrature channel input based on one or more value settings from a noise cancelation lookup table. In some embodiments, the DAS is further configured to identify one or more optimized value settings for the in-phase channel input and the quadrature channel input for specific transmission frequencies and channels. In some embodiments, the DAS is further configured to calibrate the in-phase channel input and the quadrature channel input using a gradient search algorithm that identifies an optimal load impedance for each of the specific transmission frequencies and channels. In some embodiments, the DAS is further configured to receive a feedback signal associated with the reception signal amplifier, and calibrate the in-phase channel input and the quadrature channel input based on the feedback signal.

In some embodiments, a method for performing noise cancelation is provided. According to one embodiment, the method comprises selecting, by one or more processors, a repeating switch antenna, configuring, by the one or more processors, transmission power of the repeating switch antenna, configuring, by the one or more processors, local noise cancelation of the repeating switch antenna by populating a noise cancelation lookup table with one or more values associated with a noise cancelation circuit, transmitting, by the one or more processors, read radio frequency (RF) transmission signals to the repeating switch antenna, receiving, by the one or more processors, response RF reception signals associated with the read RF transmission signals, and executing, by the one or more processors, self-jamming cancelation based on the response RF reception signals.

In some embodiments, selection of the repeating switch antenna comprises a hop in a traversal of one of a plurality of repeating switch antennas configured within a daisy chain. In some embodiments, the method further comprises configuring the transmission power to a selected amount determined by a host device comprising application software application in communication with the one or more processors. In some embodiments, the read RF transmission signals comprise instructions for directing transmission of the read RF transmission signals to a local antenna of the repeating switch antenna. In some embodiments, the response RF reception signals comprise signals transmitted from one or more RFID transponders responding to the read RF transmission signals. In some embodiments, the receiving of the response RF reception signals is performed simultaneously with the transmitting of the read RF transmission signals.

BRIEF DESCRIPTION OF THE DRAWINGS

Embodiments incorporating teachings of the present disclosure are shown and described with respect to the figures presented herein.

DETAILED DESCRIPTION

Figure 1:
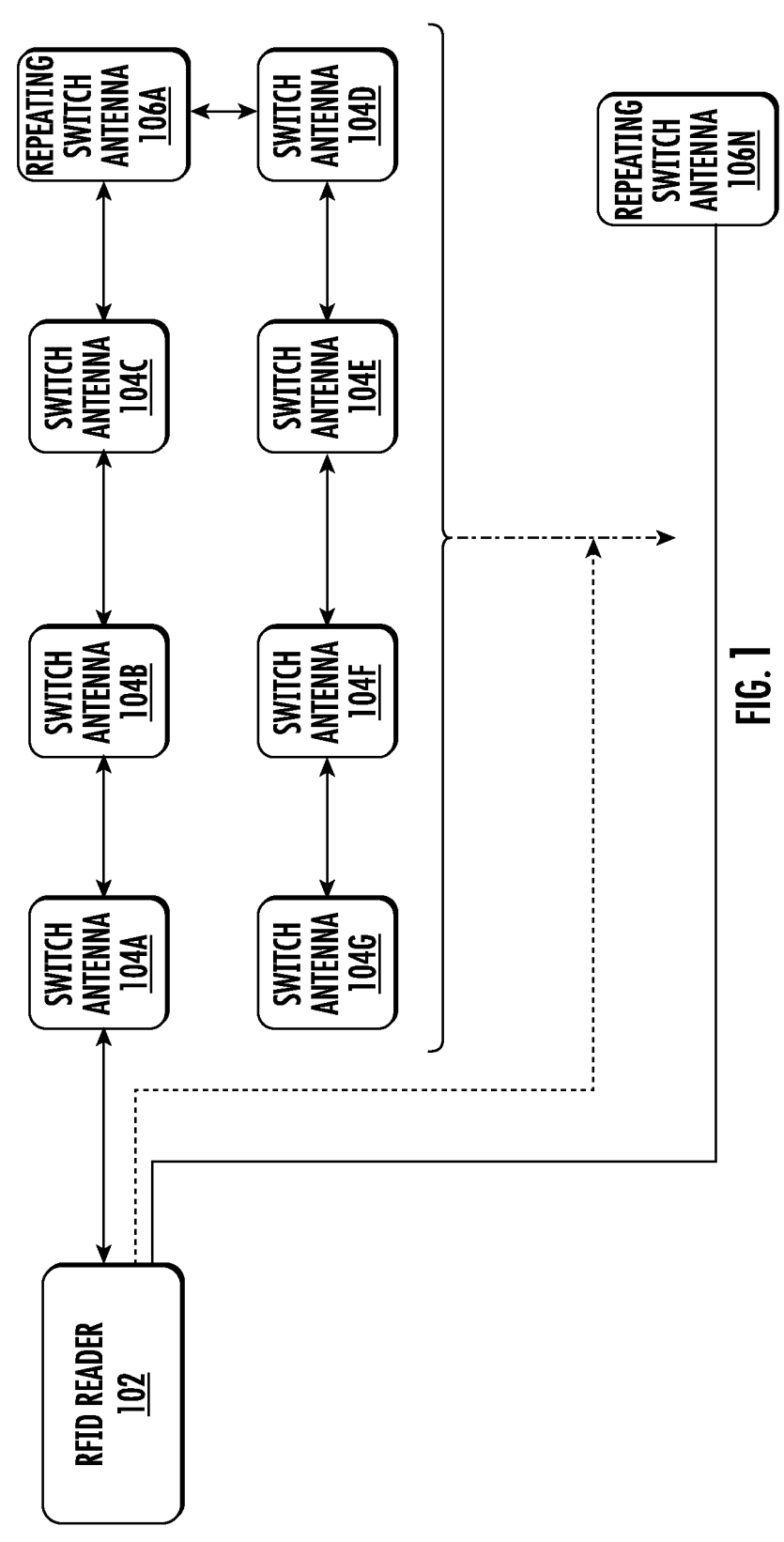
FIG. 1 illustrates an example architecture that can be used to practice embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

General Overview and Exemplary Technical Improvements

In addition to the technical challenges and difficulties described above, RFID reader-transponder environments comprising antennas connected in a daisy chain arrangement are susceptible to low sensitivity, low radio frequency (RF) power reception, and have limited sensitivity to weak signals received from RFID transponders. Antennas when configured in a daisy chain arrangement generally result in RF power losses as a result of insertion loss from each antenna losses via cable wiring. For example, an antenna located at a distant end of a daisy chain of antennas may receive low power from a RFID reader coupled to the daisy chain and hence fail to operate properly. This may further lead to degradation in antenna sensitivity to weak signals received from RFID transponders. Additionally, as antennas receive RF transmission signals from a RFID reader, a portion of the RF transmission signals may be reflected back to the RFID reader (referred as reader transmission leakage) as noise, which may cause disturbance in the RFID reader operation.

The present disclosure provides improved RFID reader range and reliability in RFID systems by integrating a repeater into a switch antenna (herein referred to as a repeating switch antenna) to amplify RFID transmission signals and reduce reader transmission leakage (or antenna receiver noise). The disclosed repeating switch antenna may be used in a RFID system comprising a daisy chain configuration to further amplify transmission signals sent from a RFID reader and weak RFID transponder responses towards the RFID reader. According to various embodiments of the present disclosure, coverage of a single RFID reader may be extended by daisy chaining the RFID reader, one or more repeating switch antennas, and one or more switch antennas.

According to various embodiments of the present disclosure, incorporation of the disclosed repeating switch antenna in a RFID system can reduce overall deployment cost with reduced readers and a topology that is more efficient. As an example, a smart package logistical truck may comprise a conventional RFID system including a plurality of inventory comprising one or more RFID transponders that are positioned at locations relative to a matrix of daisy chained switch antennas. The smart package logistical truck may require a wide amount of coverage including the extremities of the vehicle outside of an inventory location, such as an exit door at driver cabin and an exit door at the rear side. As a result, a large distance of RF cables may be required to connect the switch antennas and thus transmission power may be reduced up to, e.g., 10 dB at the last antenna of the daisy chain. Losses due to RF cabling and daisy chaining limit the readability and range of RFID transponders when extended for cable lengths greater than, e.g., 30 ft. As such, long cable lengths puts additional limitations in achieving over 90% readability of RFID transponders. Conventional solutions for improving performance may comprise adding multiple RFID readers to cover spatially separated transponders or utilizing higher cost low loss RF cables. However, the addition of RFID readers and the use of low loss RF cables increases deployment cost. Accordingly, the disclosed repeating switch antenna may solve issues associated with long RF cables by improving switch antenna performance and allowing for a greater number of antennas in a daisy chain.

Example Technical Implementation of Various Embodiments

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described with reference to example operations, steps, processes, blocks, and/or the like. Thus, it should be understood that each operation, step, process, block, and/or the like may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Example System Architecture

FIG. 1 is a schematic diagram of an example architecture 100. The architecture 100 comprises a RFID reader 102 coupled to a plurality of switch antennas 104A-104G and repeating antennas 106A-106N in a daisy chain network. RFID reader 102 may comprise a device configured to perform interrogation of one or more RFID transponders by sending query transmission signals (e.g., an electromagnetic interrogation pulse) to the one or more RFID transponders. The RFID reader 102 may be further configured to recognize at least one RFID transponder based on a response signal transmitted by the at least one RFID. RFID reader 102 may be in communication with a host device comprising application software to receive commands from the host device to perform read or write operations with respect to one or more RFID transponders.

A RFID transponder may comprise a circuit coupled to an internal antenna for receiving query transmission signals from RFID reader 102 and transmitting a corresponding response signal to the RFID reader 102. In some embodiments, the RFID reader 102 supplies a RFID transponder with power via query transmission signals in order for the RFID transponder to perform modulation of query transmission signals from the RFID reader 102. A RFID transponder may be activated by the query transmission signals from RFID reader 102 to transmit a coded message back to RFID reader 102 at a given frequency. In some embodiments, the one or more RFID transponders may be placed within architecture 100 at given locations are determined by a matrix of daisy chained switch antennas 104A-104G and repeating antennas 106A-106N which may be connected to the RFID reader 102 using RF cables.

Each of switch antennas 104A-104G may comprise a dual-mode antenna configured to switch (e.g., half-duplex mode or full-duplex mode) between transmitting RF transmission signals and receiving RF reception signals between RFID reader 102 and the one or more RFID transponders. Switch antennas 104A-104G are coupled to RFID reader 102 either directly (e.g., 104A) or indirectly via a daisy chain connection to a switch antenna (e.g., 104A) that is directly coupled to RFID reader 102, as depicted in FIG. 1. Repeating switch antennas 106A-106N may be coupled between a series of one or more switch antennas 104A-104G to resolve losses due to long distances of RF cabling and/or daisy chaining. For example, repeating switch antenna 106A may receive a low power transmission signal originating from the RFID reader 102 via a series of daisy chained switch antennas 104A, 104B, and 104C and amplify the low power transmission signal to a desired level (for example, 30 dBm). The amplified signal may then be passed further along the daisy chain network to switch antenna 104D, 104E, 104F, and 104G for further operations. As such, sensitivity and reading range can be improved by maintaining the RF power of a RF transmission signal originating from RFID reader 102 to a desired level required for operation throughout the daisy chain network. It will be understood that transmissions between RFID reader 102, switch antennas 104A-104G, and repeating antennas 106A-106N in the daisy chain network are bidirectional.

Exemplary RFID Reader Device

Figure 2:
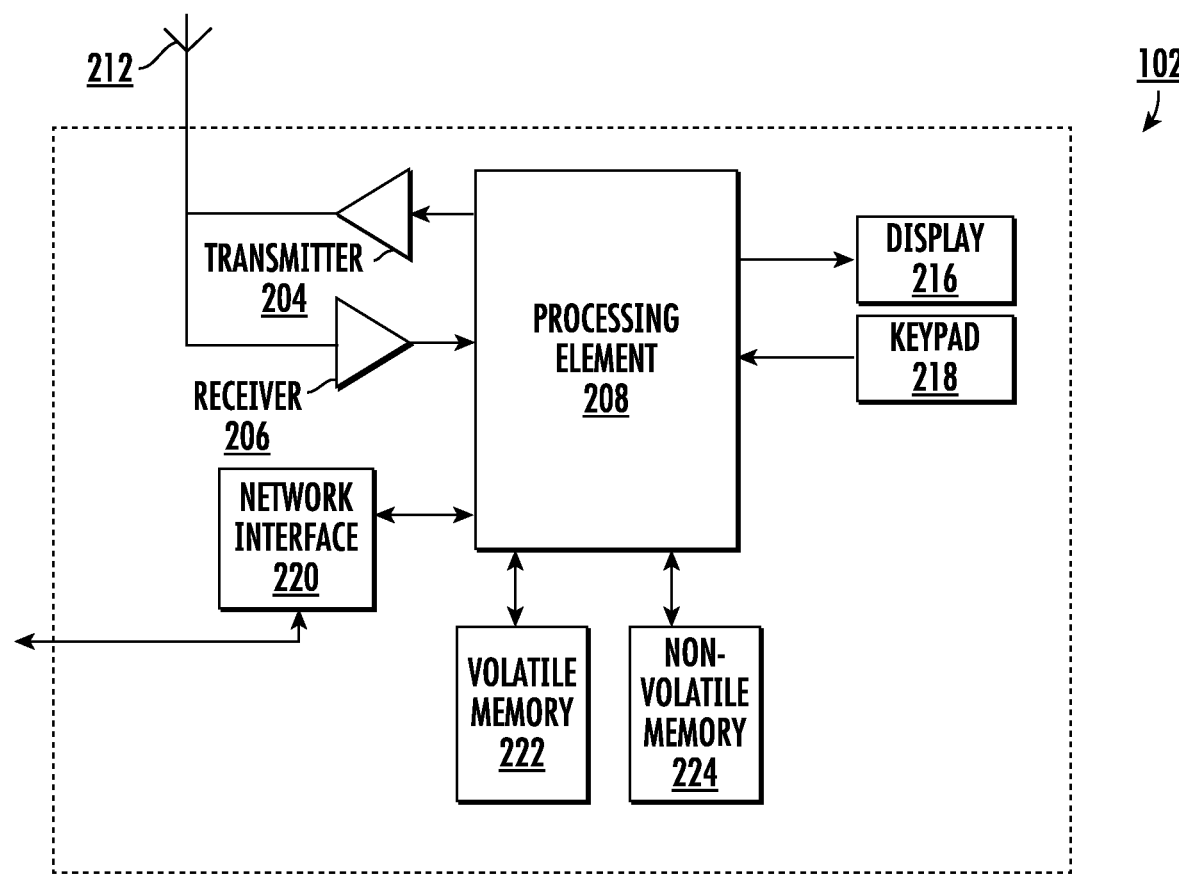
FIG. 2 illustrates an example RFID reader in accordance with some embodiments discussed herein.

FIG. 2 provides a schematic of a RFID reader 102 according to one embodiment of the present disclosure. As shown in FIG. 2, the RFID reader 102 comprises an antenna 212, a transmitter 204 (e.g., radio), a receiver 206 (e.g., radio), and a processing element 208 (e.g., CPLDs, microprocessors, multi-core processors, coprocessing entities, ASIPs, microcontrollers, and/or controllers) that provides signals to and receives signals from the transmitter 204 and receiver 206, correspondingly. The signals provided to and received from the transmitter 204 and the receiver 206, correspondingly, may include signaling information/data in accordance with common RFID standards. Antenna 212 may be supplied with power by transmitter 204 to generate a transmission that powers one or more RFID transponders and receive response transmission from the one or more RFID transponders. In some embodiments, antenna 212 may comprise an interface or connection to switch antenna 104.

As will be understood, the processing element 208 may be embodied in a number of different ways. For example, the processing element 208 may be embodied as one or more complex programmable logic devices (CPLDs), microprocessors, multi-core processors, coprocessing entities, application-specific instruction-set processors (ASIPs), microcontrollers, and/or controllers. Further, the processing element 208 may be embodied as one or more other processing devices or circuitry. The term circuitry may refer to an entirely hardware embodiment or a combination of hardware and computer program products. Thus, the processing element 208 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 208 may be configured for a particular use or configured to execute instructions stored in volatile or non-volatile media or otherwise accessible to the processing element 208. As such, whether configured by hardware or computer program products, or by a combination thereof, the processing element 208 may be capable of performing steps or operations according to embodiments of the present disclosure when configured accordingly. In some embodiments, the processing element 208 in combination with volatile memory 222 and non-volatile memory 224 may be configured to perform digital signal processing and procedures with respect to transmissions between the RFID reader 102 and one or more RFID transponders. Processing element 208 may be used by RFID reader 102 to communicate and/or interrogate with one or more RFID transponders wirelessly by performing modulation, anticollision procedures, and decoding received data from the one or more RFID transponders.

The RFID reader 102 may also operate in accordance with multiple wired and wireless communication standards and protocols, via a network interface 220. In this regard, the RFID reader 102 may be capable of operating with one or more air interface standards, communication protocols, modulation types, and access types. In a particular embodiment, the RFID reader 102 may operate in accordance with a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the RFID reader 102 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Via these communication standards and protocols, the RFID reader 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The RFID reader 102 can also download changes, add-ons, and updates, for instance, to its firmware, software (e.g., including executable instructions, applications, program modules), and operating system.

According to some embodiments, the RFID reader 102 may include location determining aspects, devices, modules, functionalities, and/or similar words used herein interchangeably. For example, the RFID reader 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the DecimalDegrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the RFID reader's 102 position in connection with a variety of other systems, including cellular towers, Wi-Fi access points, and/or the like. Similarly, the RFID reader 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID transponders, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The RFID reader 102 may also comprise a user interface (that can include a display 216 coupled to a processing element 208) and/or a user input interface (coupled to a processing element 208). For example, the user interface may be a user application, browser, user interface, and/or similar words used herein interchangeably executing on and/or accessible via the RFID reader 102 to interact with and/or cause display of information/data from the architecture 100, as described herein. The user input interface can comprise any of a number of devices or interfaces allowing the RFID reader 102 to receive data, such as a keypad 218 (hard or soft), a touch display, voice/speech or motion interfaces, or other input device. In embodiments including a keypad 218, the keypad 218 can include (or cause display of) the conventional numeric (0-9) and related keys (#, *), and other keys used for operating the RFID reader 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The RFID reader 102 can also include volatile storage or memory 222 and/or non-volatile storage or memory 224, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the RFID reader 102.

In some embodiments, RFID reader 102 may communicate with at least one host device using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

Example Switch Antenna and Range Extending Switch Antenna

Figure 3:
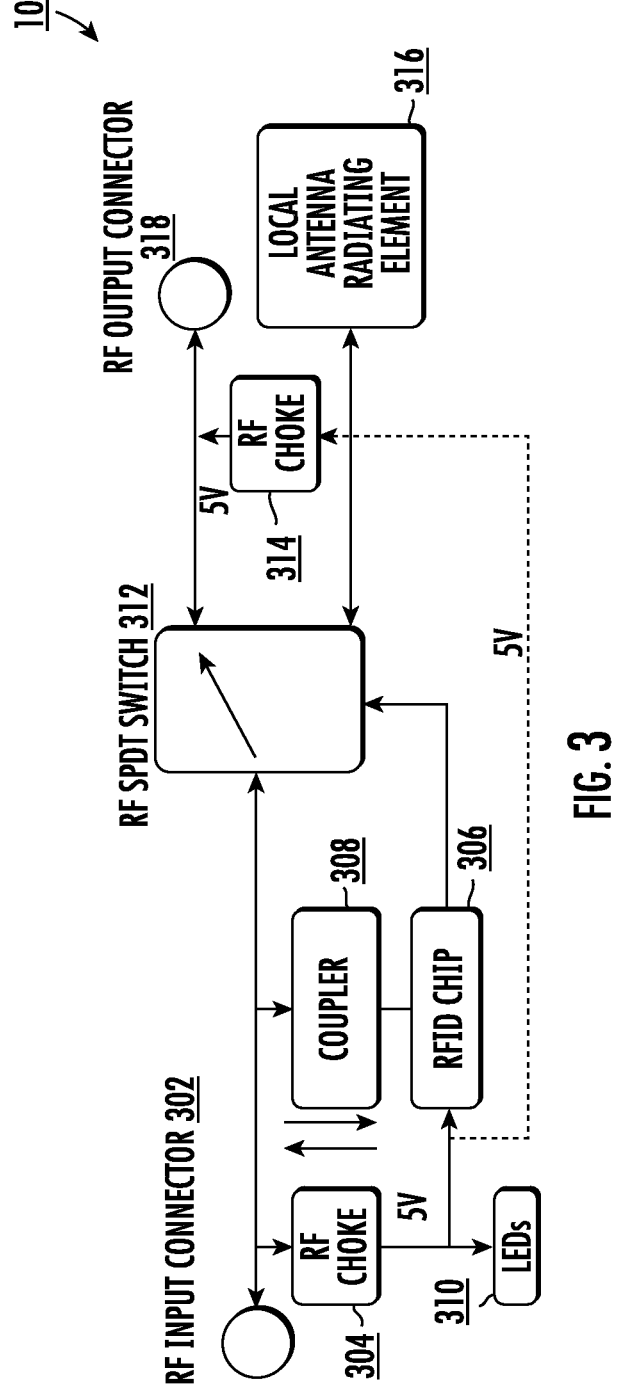
FIG. 3 illustrates an example switch antenna in accordance with some embodiments discussed herein.

FIG. 3 provides an illustrative schematic representative of one of switch antennas 104A-104G that can be used in conjunction with embodiments of the present disclosure. As shown in FIG. 3, the switch antenna 104 comprises a RF input connector 302 capable of receiving RF transmission signals, e.g., originating from RFID reader 102 via a RF cable. The RF transmission signals may comprise transmissions comprising signals originating from RFID reader 102 to communicate with one or more RFID transponders. RF transmission signals received by RF input connector 302 may be simultaneously directed to RF single pole, double throw (SPDT) switch 312 and RFID integrated circuit (IC) 306 (e.g., EM4325), via coupler 308. The RF transmission signals may be routed by SPDT switch 312 which can be controlled by RFID IC 306. In some embodiments, coupler 308 may comprise a 35 dB coupler configured to attenuate the RF transmission signals for use as input by RFID IC 306, which allows for control of the RF SPDT switch 312

In some embodiments, A RF transmission signal may comprise a query transmission signal from RFID reader 102 comprising a command that controls RF SPFT switch 312 to direct the RF transmission signal to either RF output connector 318, or local antenna radiating element 316. The command may be generated by the RFID reader 102 based on commands received by the RFID reader 102 via a host device in communication with RFID reader 102. In some embodiments, RFID reader 102 may transmit RF transmission signals to perform sequential reading of one or more RFID transponders at each of switch antennas 104A-104G in a cyclic manner along a daisy chain and for a predetermined duration time (e.g., 500 ms, one or more seconds) at each of switch antennas 104A-104G that is sufficient to scan for RFID transponders within a vicinity of each switch antennas 104A-104G.

In some embodiments, the RFID reader 102 may comprise a database of locations associated with the switch antennas 104A-104G for which RFID reader 102 is instructed to read. For example, RFID reader 102 may transmit a RF transmission signal indicating whether to perform local reading at a location associated with a given one of switch antenna 104A-104G or bypass the RF transmission signal via RF output connector 318 to a next one of switch antennas 104A-104G to perform reading at another location along a daisy chain of switch antennas 104A-104G. As such, the RF transmission signals directed to the RF SPDT switch 312 may be communicated to a next device (e.g., switch antenna 104, repeating switch antenna 106, or RFID reader 102) along the daisy chain of, for example, architecture 100, though RF cable via RF output connector 318 or to a local RFID transponder via local antenna radiating element 316.

In some embodiments, RF SPDT switch 312 comprises a symmetrical device. That is, RF SPDT switch 312 may be controlled by RFID IC 306 to allow RF transmission signals in a plurality of directions and pathways, for example, between RF input connector 302 and RF output connector 318 or between RF input connector 302 and local antenna radiating element 316. As such, RF SPDT switch 312 allows switch antenna 104 to provide bi-directional transmission of RF transmission and RF reception signals to and from an RFID reader 102, switch antennas 104A-104G, repeating switch antennas 106A-106N, or one or more RFID transponders, by selectively enabling a circuit to the RF output connector 318 or to the local antenna radiating element 316. For example, RF SPDT switch 312 may be configured by RFID IC to: (i) route a signal pathway from RF input connector 302 to local antenna radiating element 316, (ii) route a signal pathway from local antenna radiating element 316 to RF input connector 302, (iii) route a signal pathway from RF input connector 302 to RF output connector 318, or (iv) route a signal pathway from RF output connector 318 to RF input connector 302.

A constant direct current (DC) voltage, e.g., 5V, may be driven by RF transmission signals through RF choke 304 to be used by LEDs 310 (e.g., light indicators) and RFID IC 306. The DC voltage from RF choke 304 may be further passed to RF choke 314 and then to RF output connector 318 for providing the constant DC voltage along the daisy chain. RF choke 304 and RF choke 314 may be configured to filter digital RF noise (e.g., electro-magnetic interference and/or radio frequency interference) from RF transmission signals. RF choke 304 and RF choke 314 may comprise inductors configured to block higher-frequencies from RF transmission signals while passing DC and lower-frequencies AC signals through.

Figure 4:
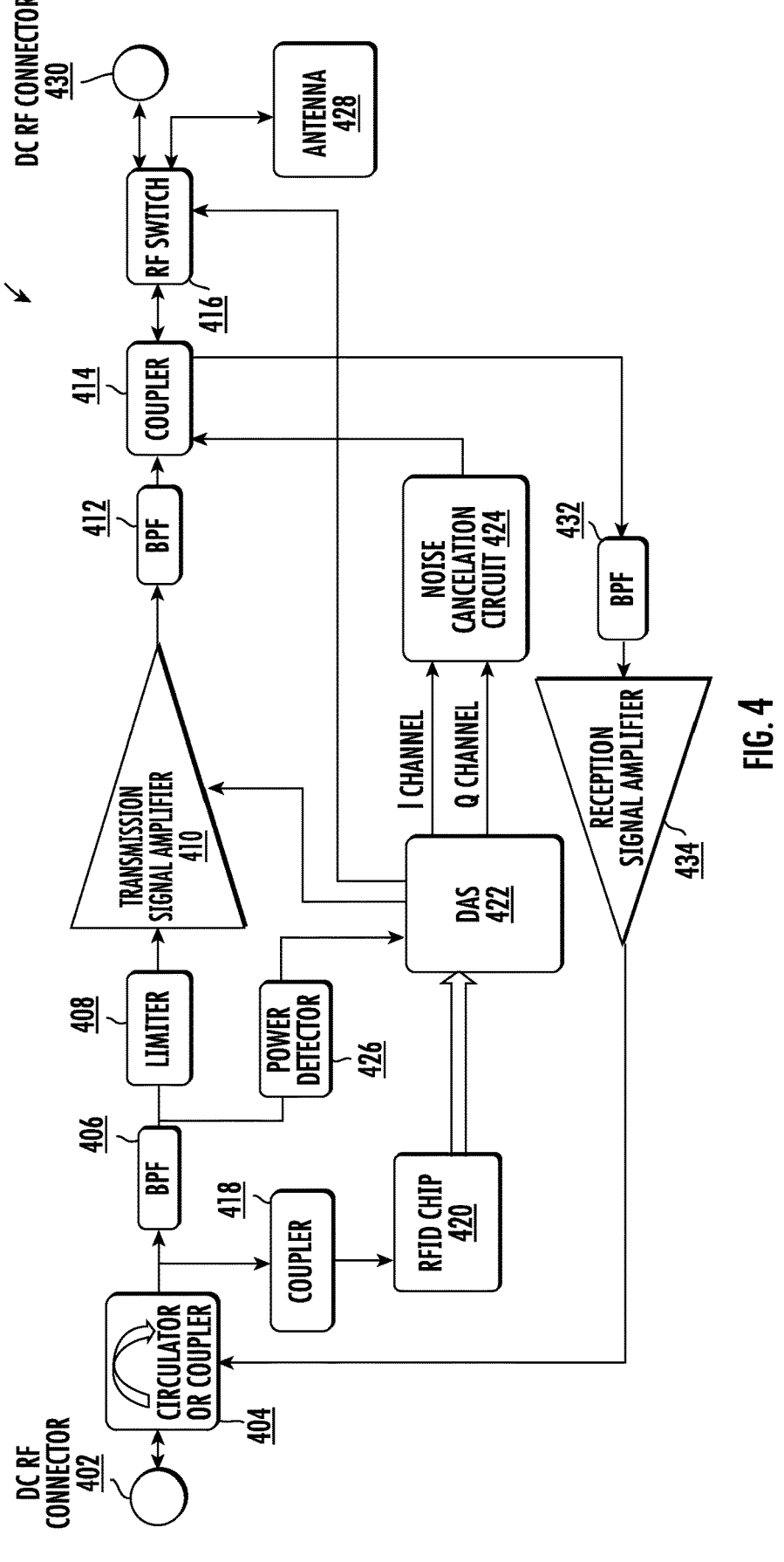
FIG. 4 illustrates an example repeating switch antenna in accordance with some embodiments discussed herein.

FIG. 4 provides an illustrative schematic representative of a repeating switch antenna 106 that can be used in conjunction with embodiments of the present disclosure. According to various embodiments of the present disclosure, a repeating switch antenna 106 may be configured to amplify RF transmission signals transmitted from RFID reader 102 to one or more daisy chained switch antennas 104A-104G to compensate for signal power losses due to cabling and daisy chaining.

A RF transmission signal may be received at DC RF connector 402 comprising a transmission forwarded by, e.g., a switch antenna 104, and originating from, for example, RFID reader 102. The RF transmission signal may comprise a power signal lower than originally transmitted, e.g., from RFID reader 102. At least a portion of the RF transmission signal may be directed to a series of components comprising band pass filter (BPF) 406, limiter 408, and transmission signal amplifier 410 by a circulator or coupler 404 to amplify the RF transmission signal to a required operating level (for example, 30 dBm). Transmission signal amplifier 410 may receive a modified (e.g., filtered) signal from BPF 406 and limiter 408 of the at least a portion of the RF transmission signal. A combination of BPF 406 and limiter 408 may be used to modify the at least a portion of the RF transmission signal directed from circulator or coupler 404 such that it is suitable for input (e.g., to prevent damage) to transmission signal amplifier 410. For example, BPF 406 may be configured to filter the RF transmission signal received at DC RF connector 402 to a set of desired frequency ranges and limiter 408 may be configured to set a limit on signal power of the RF transmission signal filtered by the BPF 406.

Transmission signal amplifier 410 may amplify the RF transmission signal by a specific amount based on a RF power control signal received from digital acquisition system (DAS) 422. In some embodiments, DAS 422 may comprise a programmable system on chip (PSoC), a field programmable gate array (FPGA), an application-specific integrated circuit (ASIC), a programmable logic, or a microprocessor. The DAS 422 may further comprise a digital to analog converter (DAC), non-volatile random access memory (NVRAM), programmable state-machine logic, pulse-width modulation generators, and waveform generators. DAS 422 may be configured control an amount transmission signal amplifier 410 increases the power of the at least a portion of the RF transmission signal and dynamically adjust the power of the at least a portion of the RF transmission signal to compensate for losses (e.g., RF cabling and daisy chaining). DAS 422 may sample the power of the at least a portion of the RF transmission signal from BPF 406 via power detector 426.

Power detector 426 may comprise a RF circuit configured to detect transmission power level or signal strength of the at least a portion of the RF transmission signal. Power detector 426 may transmit an analog signal representative of the power level or signal strength of the at least a portion of the RF transmission signal to DAS 422. DAS 422 may digitize the analog signal via an analog-to-digital converter (ADC) to analyze the power of the at least a portion of the RF transmission signal to determine how much to compensate for RF transmission signal power loss experienced and generate a feedback signal comprising a RF power control signal to transmission signal amplifier 410. DAS 422 may generate the RF power control signal based on the detected transmission power level or signal strength of the at least a portion of the RF transmission signal from power detector 426 and determine a pre-determined power amplifier bias for the sampled power of the RF transmission signal. In some embodiments, one or more pre-determined power amplifier bias values may be specified for different RF transmission signal input power levels by RFID IC 420 and/or RFID reader 102 and stored in a transmission power lookup table on DAS 422. The pre-determined power amplifier bias may be retrieved from the transmission power lookup table on DAS 422 and used to generate the RF power control signal to the transmission signal amplifier 410. The pre-determined power amplifier bias may comprise a setting value for transmission signal amplifier 410 to increase a RF transmission signal to a pre-determined transmission output power.

An amplified RF transmission signal from transmission signal amplifier 410 may be transmitted to BPF 412. BPF 412 may modify the amplified RF transmission signal (e.g., filtering of certain frequencies) and transmit the modified amplified RF transmission signal to coupler 414. Coupler 414 may comprise an input port and a main-line output port directly connected to the input port. The input port may be configured to pass the modified amplified RF transmission signal from BPF 412 to RF switch 416 via the main-line output port. RF switch 416 may be configured by DAS 422 to route the amplified signal to either bypass to DC RF connector 430, or local transmit to antenna 428. Bypassing the amplified signal to DC RF connector 430 may cause forwarding of the amplified signal to another device, such as a next switch antenna 104 coupled to repeating switch antenna 106 via RF cable, e.g., in a daisy chain. Antenna 428 may comprise a local antenna capable of broadcasting a RF transmission signal within a radius from repeating switch antenna 106.

DAS 422 may generate a local/bypass select signal to control the routing of RF switch 416 to DC RF connector 430 or antenna 428. The local/bypass select signal may identify whether RF transmission signals received by repeating switch antenna 106 from RFID reader 102 directly or indirectly (e.g., along a daisy chain) are routed for local broadcasting via antenna 428 or for another device directly or indirectly (e.g., along the daisy chain) coupled to repeating switch antenna 106 via DC RF connector 430 with a RF cable. The local/bypass select signal may be generated based on commands for cycling through one or more RFID transponders associated with switch antennas 104A-104G and repeating switch antennas 106A-106N. For example, the commands may be received by a RFID reader 102 coupled to a host device comprising application software for performing reading of a location and duration with respect to the one or more RFID transponders. RFID IC 420 may receive the commands via at least a portion of the RF transmission signal received at DC RF connector 402 and diverted by circulator or coupler 404 to coupler 418. The RF transmission signal may be used by RFID IC 420 to provide data, such as unique identifiers associated with switch antennas 104A-104G or repeating switch antennas 106A-106N associated with spatially different locations to DAS 422 for generating the local/bypass select signal. DAS 422 may be coupled to RFID IC 420 via a serial peripheral interface (SPI).

According to various embodiments of the present disclosure, RF switch 416 may route RF transmission signals and RF reception signals in a plurality of directions and pathways, for example, from and to an RFID reader 102, switch antenna 104, repeating switch antenna 106, or one or more RFID transponders, by selectively enabling a circuit to the DC RF connector 430 or to the antenna 428. For example, RF switch 416 may be configured by DAS 422 to: (i) route a signal pathway from DC RF connector 402 to antenna 428 (e.g., via BPF 406, limiter 408, transmission signal amplifier 410, BPF 412, and coupler 414), (ii) route a signal pathway from antenna 428 to DC RF connector 402, (iii) route a signal pathway from DC RF connector 402 to DC RF connector 430, or (iv) route a signal pathway from DC RF connector 430 to DC RF connector 402. That is, RF switch 416 may allow for duplexing or half-duplexing communication of a plurality of RF transmission signals and RF reception signals (e.g., transmitting and receiving) via DC RF connector 430 and antenna 428.

Coupler 414 may be capable of receiving and outputting RF transmission signals and RF reception signals comprising transmission and reception paths. For example, in addition to passing an amplified signal to RF switch 416, coupler 414 may be further configured to receive RF reception signals from RF switch 416 originating from DC RF connector 430 and antenna 428 routed from. As such, coupler 414 can be configured to direct amplified signals from transmission signal amplifier 410 through a transmission path and direct RF reception signals from DC RF connector 430 and antenna 428 through a reception path. RF reception signals from RF switch 416 may be received by the coupler 414 at a main-line output port and diverted to an isolated port connected to a series of components comprising BPF 432 and reception signal amplifier 434 to amplify RF reception signals to compensate for reception losses (e.g., daisy chain). Reception signal amplifier 434 may comprise an electronic amplifier, such as a low-noise amplifier that amplifies a very low-power signal without significantly degrading its signal-to-noise ration. RF reception signals may be received by reception signal amplifier 434 from BPF 432 and amplified according to a predetermined amount (e.g., 15 dBm).

Amplified RF reception signals generated by reception signal amplifier 434 may be received by circulator or coupler 404 and directed to DC RF connector 402 for reception by RFID reader 102, either directly from DC RF connector 402 or via a daisy chain of one or more of switch antennas 104A-104G and repeating switch antennas 106A-106N. In some embodiments, RFID reader 102 may detect whether amplified RF reception signals received transmitted from any one of switch antennas 104A-104G and repeating switch antennas 106A-106N in the daisy chain is too low or high and provide feedback to one or more of repeating switch antennas 106A-106N to calibrate amplification of RF reception signals.

In certain instances, an amplified signal (from transmission signal amplifier 410) in the presence of RF reception signals may distort the RF reception signals despite existing in different signal paths. In particular, an amplified RF transmission signal on a transmission path of coupler 414 may cause interference or signal leakage onto a simultaneously received RF reception signal passing through coupler 414 on a reception path. For example, RF reception signals received by repeating switch antenna 106 from DC RF connector 430 and antenna 428 may be substantially weaker in power than that of a RF transmission signal amplified by transmission signal amplifier 410 for transmission. As such, the presence of the amplified RF transmission signal in coupler 414, despite being in the transmission path, may cause transmission noise capable of leaking into the reception path, and thus, overcoming any RF reception signals.

According to various embodiments of the present disclosure, repeating switch antenna 106 may further comprise transmission leakage reduction circuitry for preventing cross signal interference between transmission and RF reception signals at coupler 414. In particular, a noise cancellation circuit 424 is coupled to a coupled port of coupler 414. In some embodiments, noise cancelation circuit 424 may comprise a 90 degree coupler using I (in-phase) and Q (quadrature) modulation. The noise cancellation circuit 424 may be controlled by DAS 422 to generate a dynamically varied load impedance on the coupled port of coupler 414 for reducing the effects of transmission leakage at coupler 414. Load impedance generated by noise cancellation circuit 424 at a coupled port of coupler 414 may provide a reflected power to create or cause a cancelation effect on transmission leakage from RF transmission signals, e.g., received at the input port of coupler 414.

DAS 422 may control noise cancelation circuit 424 by generating inputs for an in-phase (herein referred to as "I") channel and a quadrature (herein referred to as "Q") channel based on one or more I/Q value settings that may be retrieved from a noise cancelation lookup table in NVRAM of DAS 422. In some embodiments, the I-channel may be associated with an in-phase signal and the Q-channel may be associated with a quadrature signal. Each of the I- and Q-channels may be associated with respective resistor-capacitor (RC) circuits within noise cancelation circuit 424 such that impedance values of both RC circuits may be summed to produce a load impedance on the coupled port of coupler 414. In some embodiments, the one or more I/Q value settings may be determined by a host device comprising application software application in communication with the RFID reader.

In some alternative embodiments, DAS 422 may be configured to identify one or more optimized I/Q value settings for specific transmission frequencies and channels of RF transmission signals received at DC RF connector 402 from RFID reader 102. The specific transmission frequencies and channels may comprise frequencies and channels used by RFID reader 102 for a set amount of time (e.g., one or more seconds) to transmit information to given RFID transponders. For each frequency and channel, the I-channel and Q-channel inputs may be calibrated according to a selected load impedance provided to the coupled port of coupler 414 such that noise received at RFID reader 102 from an amplified RF reception signal is minimized. For example, DAS 422 may determine a load impedance value within a range of 40-70 Ohms where transmission leakage is lowest for each of the transmission frequencies and channels. In some embodiments, identification of the optimized I/Q values may be performed by RFID reader 102 during an initialization routine for configuring frequency/device hopping to read one or more RFID transponders located at various points within a daisy chain of switch antennas 104A-104G and repeating switch antennas 106A-106N. In some embodiments, optimized I/Q values identified by DAS

422 may be stored to a noise cancelation lookup table on DAS 422 for subsequent retrieval during frequency/device hopping. In some embodiments, DAS 422 may calibrate inputs to the I- and Q-channels using a gradient search algorithm to identify an optimal load impedance for each frequency and channel.

As an example, at frequency 910 MHz, values for the I- and Q-channel inputs of the noise cancellation circuit 424 are calibrated to tune a load impedance output to an optimal value. The calibrated I- and Q-channel inputs for frequency channel 910 MHz may then be stored in a noise cancelation lookup table on DAS 422. For a next frequency hop, values for the I- and Q-channel inputs of the noise cancellation circuit 424 may be calibrated for a frequency 920 MHz to tune a load impedance and the calibrated I- and Q-channel inputs for frequency 920 MHz are stored in the noise cancelation lookup table on DAS 422. The described process with respect to the 910 MHz and 920 MHz frequency channels may be performed for each initial frequency hop in a set of frequencies used by RFID reader 102 to transmit RF transmission signals to switch antennas 104A-104G and repeating switch antennas 106A-106N for communicating with one or more RFID transponders. As such, if the RFID reader 102 hops back at frequency of 910 MHz, the DAS 422 may use the noise cancelation lookup table to retrieve the I- and Q-channel input values for a load impedance value for frequency channel 910 MHz and provide the retrieved values to noise cancellation circuit 424.

Figure 5:
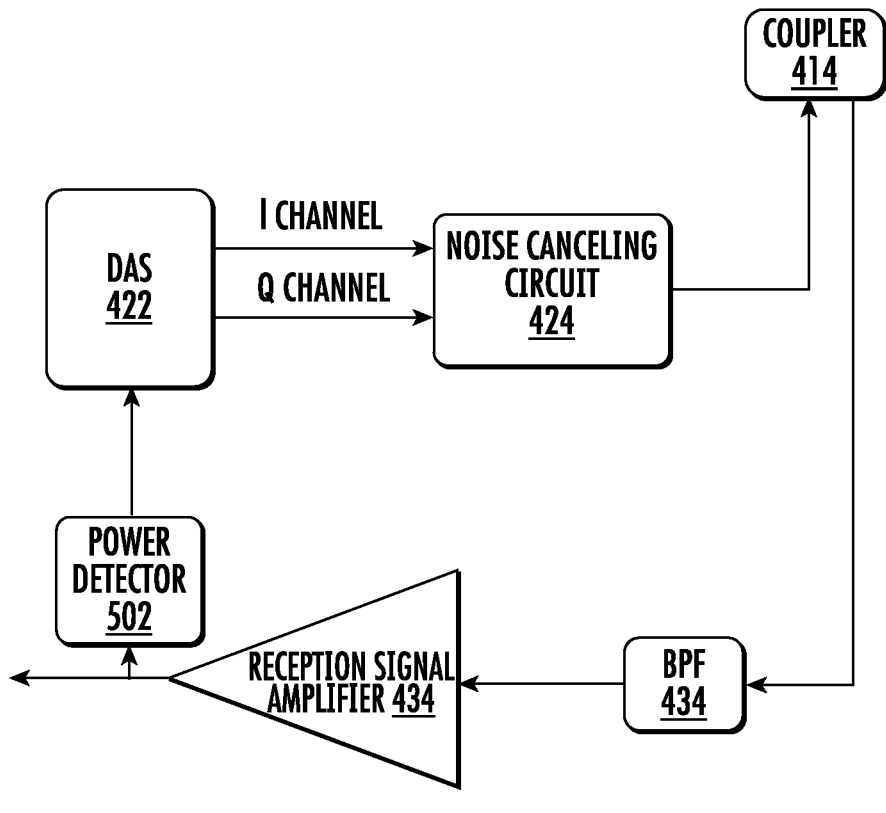
FIG. 5 illustrates a modified portion of a repeating switch antenna in accordance with some embodiments discussed herein.

FIG. 5 provides an illustrative schematic representative of a modified portion of a repeating switch antenna that can be used in conjunction with embodiments of the present disclosure. As discussed above, DAS 422 may identify one or more optimized I/Q value settings for one or more specific transmission frequencies and channels of RF transmission signals received at DC RF connector 402 from RFID reader 102. According to various embodiments of the present disclosure, a portion of repeating switch antenna 106 is modified such that a feedback signal may be provided to DAS 422 from reception signal amplifier 434. The feedback signal provided to DAS 422 may comprise an analog signal generated by a power detector 502. Power detector 502 may comprise a RF circuit configured to detect transmission power level or signal strength of the amplified RF reception signal generated by reception signal amplifier 434.

DAS 422 may digitize the analog signal received from power detector 502 via an ADC, analyze the signal of the amplified RF reception signal, and determine how to calibrate the I- and Q-channel inputs of noise cancelation circuit 424 based on the analysis of the analog signal such that noise in the amplified RF reception signal is minimized. A combination of the I- and Q-channel inputs may cause noise cancelation circuit 424 to generate a specific load impedance on a coupled port of coupler 414. For example, the I- and Q-channel inputs may be continuously varied until a load impedance generated by noise cancelation circuit 424 reaches a value such that noise in the amplified RF reception signal is minimum.

Example Noise Cancelation Operations

Figure 6:
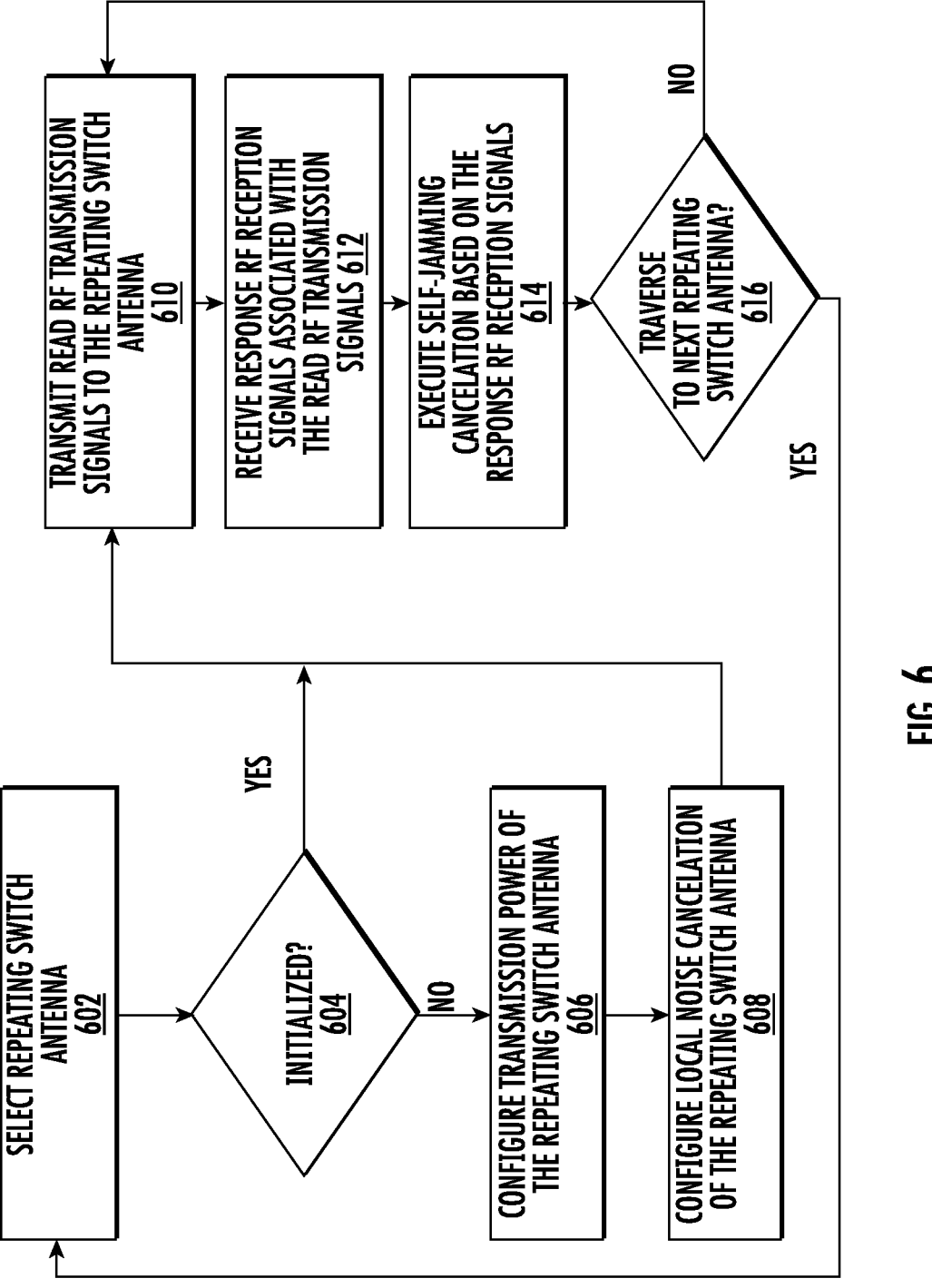
FIG. 6 illustrates a flowchart of a method for performing noise cancelation during reading operations in accordance with some embodiments discussed herein.

FIG. 6 presents a flowchart of a process for performing noise cancelation during reading operations according to some embodiments of the present disclosure. The process 600 includes example operations that may be performed by the RFID reader 102, and the RFID reader 102 comprises means, such as processing element 208, memories 222 and 224, network interface 220, and/or the like, for performing the example operations.

At step 602, a RFID reader selects a repeating switch antenna for performing a read operation. The repeating switch antenna may be selected as a hop in a traversal of one of a plurality of repeating switch antennas configured within a daisy chain, of which, RFID reader may communicate with as part of a device hopping procedure. According to various embodiments of the present disclosure, selection of the repeating switch antenna may begin an initialization routine to configure the repeating switch antenna for reading, by the RFID reader, one or more RFID transponders in the vicinity of the repeating switch antenna. In some embodiments, subsequent to step 602, the example method proceeds to step 604, where the RFID reader determines whether the selected repeating switch antenna has been initialized. If the selected repeating switch antenna has been initialized, in some embodiments, subsequent to step 604, the example method proceeds to step 610.

If the selected repeating switch antenna is not initialized, in some embodiments, subsequent to step 604, the example method proceeds to step 606, where the RFID reader configures transmission power of the repeating switch antenna. The transmission power of the repeating switch antenna may be configured to a selected amount as determined by a host device comprising application software application in communication with the RFID reader. For example, the application software application may determine a transmission power that is most practical and efficient for a specific use case. Some consideration that may be factored in determining the transmission power may include, but not limited to, desired signal range, signal stability, and power consumption. In some embodiments, the power setting may be selected from a given range, such as 15 dBm to 27 dBm. The RFID reader may configure the transmission power by transmitting a RF transmission signal comprising a power setting to the repeating switch antenna, either directly, or indirectly via, e.g., other devices along the daisy chain. The power setting may read by a RFID IC on the repeating switch antenna and provided to a DAS for configuring a transmission signal amplifier that amplifies signals for transmission from the repeating switch antenna.

In some embodiments, subsequent to step 606, the example method proceeds to step 608, where the RFID reader configures local noise cancelation of the repeating switch antenna. For example, inputs or parameters for a noise cancelation circuit on the repeating switch antenna may be configured by the RFID reader. In some embodiments, the RFID reader may configure a noise cancelation lookup table stored in a DAS at the repeating switch antenna. The noise cancelation lookup table may be populated with one or more values (e.g., I- and Q-channel inputs associated with a noise cancelation circuit) that are transmitted in RF transmission signals from the RFID reader. The one or more values may be determined by a host device coupled to the RFID reader and specific to certain operating parameters, devices, configurations, as well as to one or more channels and frequencies for which RFID reader may use to transmit RF transmission signals to the repeating switch antenna.

In some embodiments, subsequent to step 608, the example method proceeds to step 610. At step 610, the RFID reader transmits read RF transmission signals to the repeating switch antenna. The read RF transmission signals may comprise instructions for directing transmission of the read RF transmission signals to a local antenna of the repeating switch antenna. As such, the RFID reader may attempt to communicate with one or more RFID transponders within a vicinity of the repeating switch antenna.

In some embodiments, subsequent to step 610, the example method proceeds to step 612, where the RFID reader receives response RF reception signals based on the read RF transmission signals. Response RF reception signals may comprise RF signals transmitted from one or more RFID transponders responding to the read RF transmission signals transmitted by the RFID reader. According to various embodiments of the present disclosure, the response RF reception signals may be received by the repeating switch antenna simultaneously with the transmitting of read RF transmission signals from the repeating switch antenna.

In some embodiments, subsequent to step 612, the example method proceeds to step 614, where the RFID reader executes self-jamming cancelation based on the response RF reception signals. The RFID reader may simultaneously receive response RF reception signals and transmit read RF transmission signals. As such, similar to transmission and reception signals in a repeating switch antenna, as described above, the RFID reader may experience transmission leakage that interferes with the reception of the response RF reception signals. To reduce interference caused by the transmission of read RF transmission signals, self-jamming cancelation may be performed by the RFID reader. In some embodiments, self-jamming cancelation may comprise detecting amplitude and phase of a transmission leakage signal and generating a suppression signal. In other embodiments, self-jamming cancelation may comprise the use of a noise cancelation circuit on a receiver component on the RFID reader.

In some embodiments, subsequent to step 614, the example method proceeds to step 616, where the RFID reader determines whether it should traverse to a next repeating switch antenna. The determination may be based on a predetermined duration of time spent transmitting read RF transmission signals to the repeating switch antenna or based on response RF reception signals received by the RFID reader (e.g., a predetermined number of RFID transponders have transmitted a response RF reception signal received by the RFID device).

If the RFID reader determines not to traverse to a next repeating switch antenna, in some embodiments, the example method proceeds to step 610 and continues to transmit read RF transmission signals to the repeating switch antenna. Otherwise, if the RFID reader determines it should traverse to a next repeating switch antenna, in some embodiments, the example method proceeds to step 602 to select a next repeating switch antenna.

CONCLUSION

It should be understood that the examples and embodiments described herein are for illustrative purposes only and that various modifications or changes in light thereof will be suggested to persons skilled in the art and are to be included within the spirit and purview of this application.

Many modifications and other embodiments of the present disclosure set forth herein will come to mind to one skilled in the art to which the present disclosures pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claim concepts. Although specific terms are employed herein, they are used in a generic and descriptive sense only and not for purposes of limitation.

What is claimed is:

1. A repeating switch antenna comprising:
a transmission signal amplifier configured to amplify a transmission signal based on a power control signal;
a first coupler configured to receive (i) the amplified transmission signal, (ii) a reception signal, and (iii) a load impedance;
a noise cancelation circuit configured to generate the load impedance based on an in-phase channel input and a quadrature channel input;
a digital acquisition system (DAS) configured to (i) generate the power control signal, (ii) generate the in-phase channel input and the quadrature channel input, and (iii) generate a select signal;
reception signal amplifier configured to receive the reception signal from the first coupler and amplify the reception signal;
a first radio frequency (RF) connector configured to receive the transmission signal and the amplified reception signal via a second coupler;
a second RF connector configured to transmit the amplified transmission signal; and,
a RF switch configured to (i) route the amplified transmission signal from the first coupler to the second RF connector or to an antenna based on the select signal, and (ii) route the reception signal to the first coupler.

2. The repeating switch antenna of claim 1, wherein the transmission signal originates from a radio frequency identification (RFID) reader.

3. The repeating switch antenna of claim 2, wherein the transmission signal is received from the RFID reader via a daisy chain comprising one or more switch antennas and one or more other ones of repeating switch antennas.

4. The repeating switch antenna of claim 1, wherein the DAS comprises one of: a programmable system on chip (PSoC), a field programmable gate array (FPGA), an application-specific integrated circuit (ASIC), a programmable logic, or a microprocessor.

5. The repeating switch antenna of claim 1 further comprising a power detector configured to:
detect a power level of the transmission signal; and,
transmit an analog signal representative of the power level of the transmission signal to the DAS.

6. The repeating switch antenna of claim 5, wherein the DAS is further configured to generate the power control signal based on the analog signal representative of the power level of the transmission signal.

7. The repeating switch antenna of claim 1, further comprising a RFID integrated circuit.

8. The repeating switch antenna of claim 1, wherein the DAS is configured to generate the select signal based on unique identifiers associated with spatially difference locations provided by the RFID integrated circuit.

9. The repeating switch antenna of claim 1, wherein the load impedance causes a cancelation effect on transmission leakage from the transmission signal.

10. The repeating switch antenna of claim 1, wherein each of the in-phase channel and the quadrature channel are associated with respective resistor-capacitor circuits within the noise cancelation circuit.

11. The repeating switch antenna of claim 1, wherein the DAS is further configured to generate the in-phase channel input and the quadrature channel input based on one or more value settings from a noise cancelation lookup table.

12. The repeating switch antenna of claim 1, wherein the DAS is further configured to identify one or more optimized value settings for the in-phase channel input and the quadrature channel input for specific transmission frequencies and channels.

13. The repeating switch antenna of claim 1, wherein the DAS is further configured to calibrate the in-phase channel input and the quadrature channel input using a gradient search algorithm that identifies an optimal load impedance for each of the specific transmission frequencies and channels.

14. The repeating switch antenna of claim 13, wherein the DAS is further configured to:
receive a feedback signal associated with the reception signal amplifier; and,
calibrate the in-phase channel input and the quadrature channel input based on the feedback signal.

15. A method for performing noise cancelation, the method comprising:
selecting, by one or more processors, a repeating switch antenna;
configuring, by the one or more processors, transmission power of the repeating switch antenna;
configuring, by the one or more processors, local noise cancelation of the repeating switch antenna by populating a noise cancelation lookup table with one or more values associated with a noise cancelation circuit;
transmitting, by the one or more processors, read radio frequency (RF) transmission signals to the repeating switch antenna;
receiving, by the one or more processors, response RF reception signals associated with the read RF transmission signals; and,
executing, by the one or more processors, self-jamming cancelation based on the response RF reception signals.

16. The method of claim 15, wherein selection of the repeating switch antenna comprises a hop in a traversal of one of a plurality of repeating switch antennas configured within a daisy chain.

17. The method of claim 15, further comprising configuring the transmission power to a selected amount determined by a host device comprising application software application in communication with the one or more processors.

18. The method of claim 15, wherein the read RF transmission signals comprise instructions for directing transmission of the read RF transmission signals to a local antenna of the repeating switch antenna.

19. The method of claim 15, wherein the response RF reception signals comprise signals transmitted from one or more RFID transponders responding to the read RF transmission signals.

20. The method of claim 15, wherein receiving the response RF reception signals is performed simultaneously with the transmitting of the read RF transmission signals.

* * * * *